US007810650B2

United States Patent
Ennis et al.

(10) Patent No.: US 7,810,650 B2
(45) Date of Patent: Oct. 12, 2010

(54) FAUCET MOUNTED WATER FILTER SYSTEM

(75) Inventors: Brandon L. Ennis, New Albany, IN (US); James Murray Klump, Crestwood, KY (US); Norman Jacques Boulard, Louisville, KY (US); Jeffery W. Borden, Louisville, KY (US); Jason Anthony Nichter, Louisville, KY (US); Glenn Leon Graham, Louisville, KY (US); Sheng-Nan Lin, Pingtung (TW)

(73) Assignee: General Electric Company, Schenectady, NY (US)

( * ) Notice: Subject to any disclaimer, the term of this patent is extended or adjusted under 35 U.S.C. 154(b) by 368 days.

(21) Appl. No.: 11/982,088

(22) Filed: Oct. 31, 2007

(65) Prior Publication Data

US 2009/0107906 A1   Apr. 30, 2009

(51) Int. Cl.
*B01D 29/00* (2006.01)
*B01D 29/88* (2006.01)
*B01D 35/28* (2006.01)
*B01D 35/00* (2006.01)

(52) U.S. Cl. .......... 210/449; 210/236; 210/238; 210/420; 210/418; 210/422; 210/424; 210/433.1; 210/85

(58) Field of Classification Search .......... 210/420, 210/236, 418, 449, 422, 424, 433.1, 455
See application file for complete search history.

(56) References Cited

U.S. PATENT DOCUMENTS

| 606,804 | A | * | 7/1898 | Eastman ............ 210/423 |
| 4,504,389 | A | * | 3/1985 | Rundzaitis ............ 210/266 |
| 5,151,179 | A | | 9/1992 | Bach et al. |
| 5,753,118 | A | | 5/1998 | Yang |
| 5,976,362 | A | | 11/1999 | Wadsworth et al. |
| 5,989,425 | A | * | 11/1999 | Yonezawa et al. ........ 210/282 |
| 6,123,837 | A | | 9/2000 | Wadsworth et al. |
| 7,000,894 | B2 | | 2/2006 | Olson et al. |
| 7,235,176 | B1 | | 6/2007 | Takagi et al. |
| 7,617,939 | B2 | * | 11/2009 | Klump et al. ........... 210/449 |
| 2005/0098485 | A1 | * | 5/2005 | Boyd et al. ............ 210/87 |
| 2005/0279676 | A1 | | 12/2005 | Izzy et al. |
| 2007/0199886 | A1 | | 8/2007 | Korb et al. |

* cited by examiner

*Primary Examiner*—Krishnan S Menon
*Assistant Examiner*—Benjamin Kurtz
(74) *Attorney, Agent, or Firm*—George L. Rideout, Esq.; Armstrong Teasdale LLP

(57) ABSTRACT

A faucet mounted water filtration system includes a base defining an inlet and a plurality of outlets. The base at least partially defines a filter compartment configured to house a filter cartridge. A first valve assembly is positioned within the base and defines a first passage and a second passage. A valve stem is movably positioned within the first passage. With the valve stem in a first position, the first passage provides fluid communication between the inlet and a first outlet and with the valve stem in a second position the second passage provides fluid communication between the inlet and the filter compartment. A body is rotatably coupled to the base and includes a first cam configured to urge the valve stem from the first position to the second position as the body rotates with respect to the base.

20 Claims, 15 Drawing Sheets

FAUCET MOUNTED WATER FILTER SYSTEM

BACKGROUND OF THE INVENTION

This invention relates generally to water treatment systems and, more particularly, to faucet mounted water filtration systems.

Water treatment devices are generally used to treat water for human consumption. At least some known water treatment devices include a filter for filtering particles or sediment from the water. In addition, at least some known water treatment devices include taste and odor filters for removing chlorine or odor causing material from the water. At least some other known water treatment devices include mercury and lead filters for removing mercury and lead from the water. Further, at least some other known water treatment devices include disinfection devices for removing, killing or inactivating microorganisms such as bacteria, virus, cysts, protozoa, and the like from the water.

In at least some water treatment systems, a filtration device is mounted to a water faucet. However, at least some faucet mounted filtration systems include external handles or diverters that render the system bulky or cumbersome to operate. At least some faucet mounted filtration systems also include a removable filter cartridge. Moreover, in at least some such systems, the faucet mounted filter system can be moved between a filtering position and a non-filtering position to extend the life of the filter cartridge. Typically, the user is responsible for certain maintenance functions such as the timely replacement of the filter cartridge.

BRIEF DESCRIPTION OF THE INVENTION

In one aspect, a faucet mounted water filtration system is provided. The faucet mounted water filtration system includes a base defining an inlet and a plurality of outlets. The base at least partially defines a filter compartment configured to house a filter cartridge. A first valve assembly is positioned within the base and defines a first passage and a second passage. A valve stem is movably positioned within the first passage. With the valve stem in a first position, the first passage provides fluid communication between the inlet and a first outlet of the plurality of outlets. With the valve stem in a second position, the second passage provides fluid communication between the inlet and the filter compartment. A body is rotatably coupled to the base. The body includes a first cam configured to urge the valve stem from the first position to the second position as the body rotates with respect to the base.

In another aspect, a faucet mounted water filtration system is provided. The faucet mounted water filtration system includes a base defining an inlet and a plurality of outlets. The base at least partially defines a filter compartment configured to house a filter cartridge. A first valve assembly is positioned within the base. The first valve assembly defines a first passage and a second passage. A valve stem is movably positioned within the first passage. With the valve stem in a first position, the first passage provides fluid communication between the inlet and a first outlet of the plurality of outlets. With the valve stem in a second position, the second passage provides fluid communication between the inlet and the filter compartment. A second valve assembly is positioned within the base. The second valve assembly includes a valve movably positioned within a third passage defined within the base. The third passage is in fluid communication with the filter compartment. The valve is movable between a third position providing fluid communication between the filter compartment and a second outlet of the plurality of outlets and a fourth position providing fluid communication between the filter compartment and a third outlet of the plurality of outlets. A body is rotatably coupled to the base. The body includes a first cam configured to urge the valve stem from the first position to the second position as the body rotates with respect to the base, and a second cam configured to urge the valve towards one of the third position and the fourth position as the body rotates with respect to the base.

In another aspect, a method is provided for making a faucet mounted water filtration system. The method includes providing a base defining an inlet and a plurality of outlets. The base at least partially defines a filter compartment configured to house a filter cartridge. A first valve assembly is positioned within the base. The first valve assembly defines a first passage and a second passage. A valve stem is movably positioned within the first passage. With the valve stem in a first position, the first passage provides fluid communication between the inlet and a first outlet of the plurality of outlets. With the valve stem in a second position, the second passage provides fluid communication between the inlet and the filter compartment. A body is rotatably coupled to the base. The body includes a first cam configured to urge the valve stem from the first position to the second position as the body rotates with respect to the base.

DETAILED DESCRIPTION OF THE INVENTION

Figure 1:
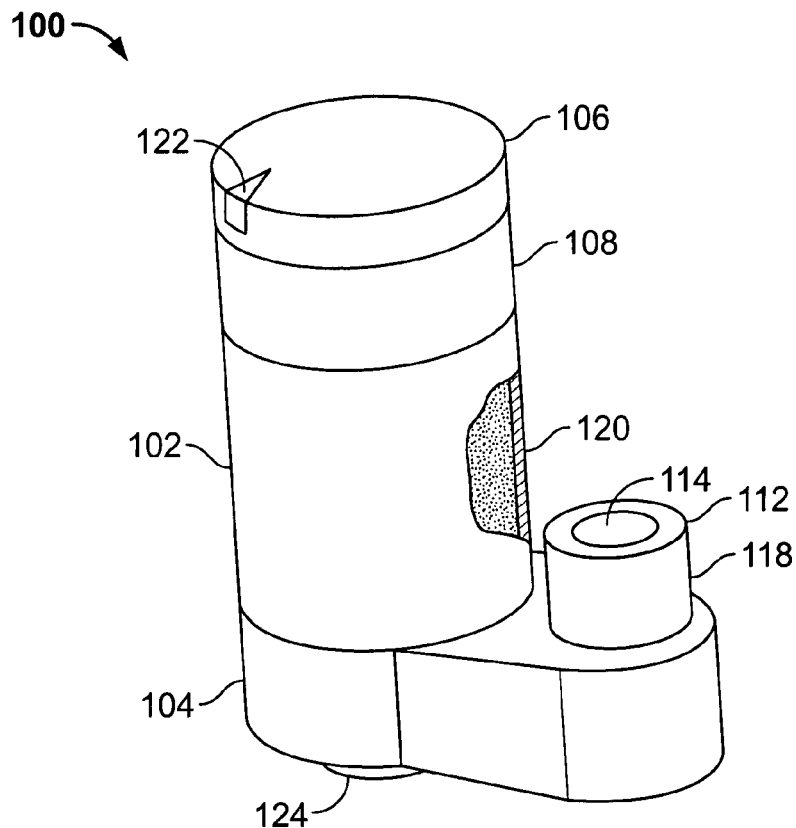
FIG. 1 is a partially cut away perspective view of an exemplary water filter system mountable to a faucet.

FIG. 1 shows an exemplary water filter assembly 100 that is mountable to a water faucet. The assembly includes a body 102 coupled to a base 104. A cover 106 is rotatably coupled to body 102. Cover 106 includes a soft touch ring 108 to aid a user in manipulation of cover 106. Base 104 includes a tightening nut 112 having an inlet 114 configured to receive an end of a faucet (not shown). Tightening nut 112 also includes a soft touch ring 118 for ease in manipulating tightening nut 112. Body 102 houses a filter cartridge 120 for filtering water coming into filter assembly 100. In the exemplary embodiment, cover 106 includes a display 122 that provides an indication of a condition of filter cartridge 120. Base 104 includes at least one outlet on an underside 124 that delivers filtered or unfiltered water as selected by a user based on the position of cover 106 with respect to base 104.

Figure 2:
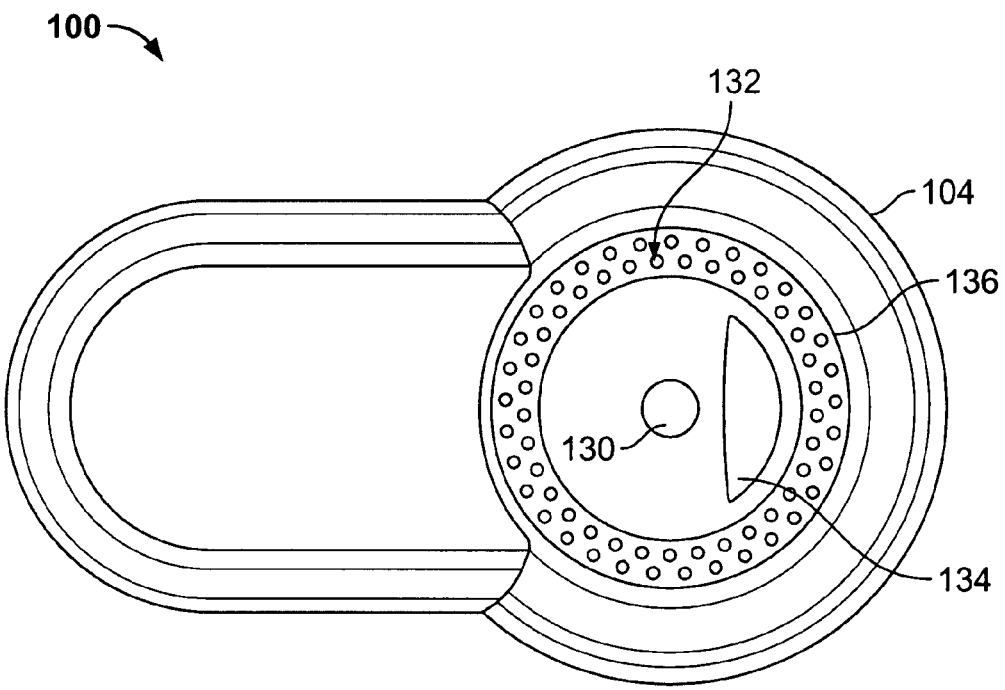
FIG. 2 is a bottom view of the water filter system shown in FIG. 1.

FIG. 2 shows underside 124 of filter assembly 100. In the exemplary embodiment, filter assembly 100 includes a first outlet 130 providing a filtered water stream, a second outlet 132 providing an unfiltered water spray, and a third outlet 134 providing an unfiltered water stream. The water stream provided at third outlet 134 may or may not be an aerated water stream. Outlets 130, 132, and 134 are formed in a cap 136 that may be removed for outlet screen cleaning. In one embodiment, cap 136 is threadedly attached to base 104.

Figure 3:
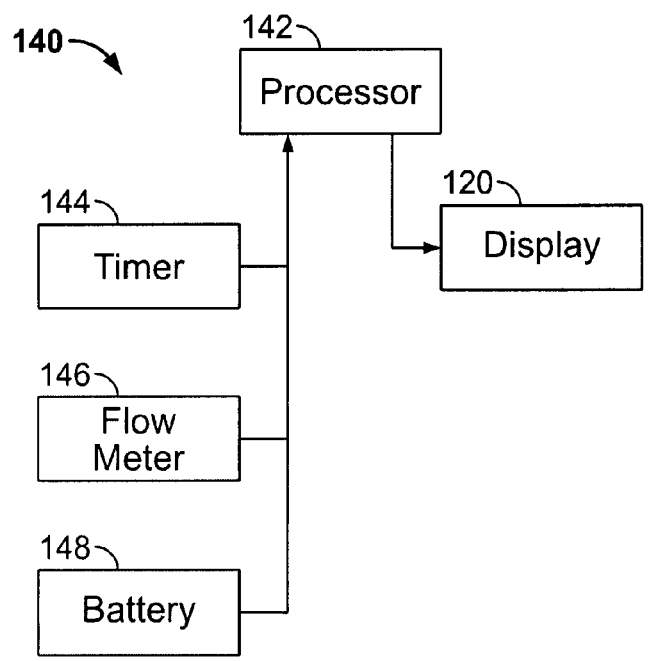
FIG. 3 is a schematic block diagram of an exemplary monitoring system for a faucet mount water filter system.

FIG. 3 shows a schematic block diagram of a monitoring system 140 for use with filter assembly 100 to monitor a condition of filter cartridge 120. Monitoring system 140 monitors a time that filter cartridge 120 has been in service or in use in body 102 and also a volume of water flow through filter cartridge 120. Indications of the condition of filter cartridge 120 are displayed in display 122. In an exemplary embodiment, display 122 may include one or more light emitting diodes (LED's) that visually indicate the condition of filter cartridge 120. In an exemplary embodiment, monitoring system 140 includes a processor 142 and a timer 144. Timer 144 is, in one embodiment, included within processor 142. In alternative embodiments, timer 144 is external to processor 142. When timer 144 is external to processor 142, timer 144 may be reset when filter cartridge 120 is changed. Monitoring system 140 may also include a flow meter 146 for monitoring a volume of water filtered by filter cartridge 120. Monitoring system 140 is powered by a battery 148. In the exemplary embodiment, processor 142 also monitors a condition of battery 148 and provides an indication that battery 148 needs replacement when the useful life of battery 148 is reached.

Figure 4:
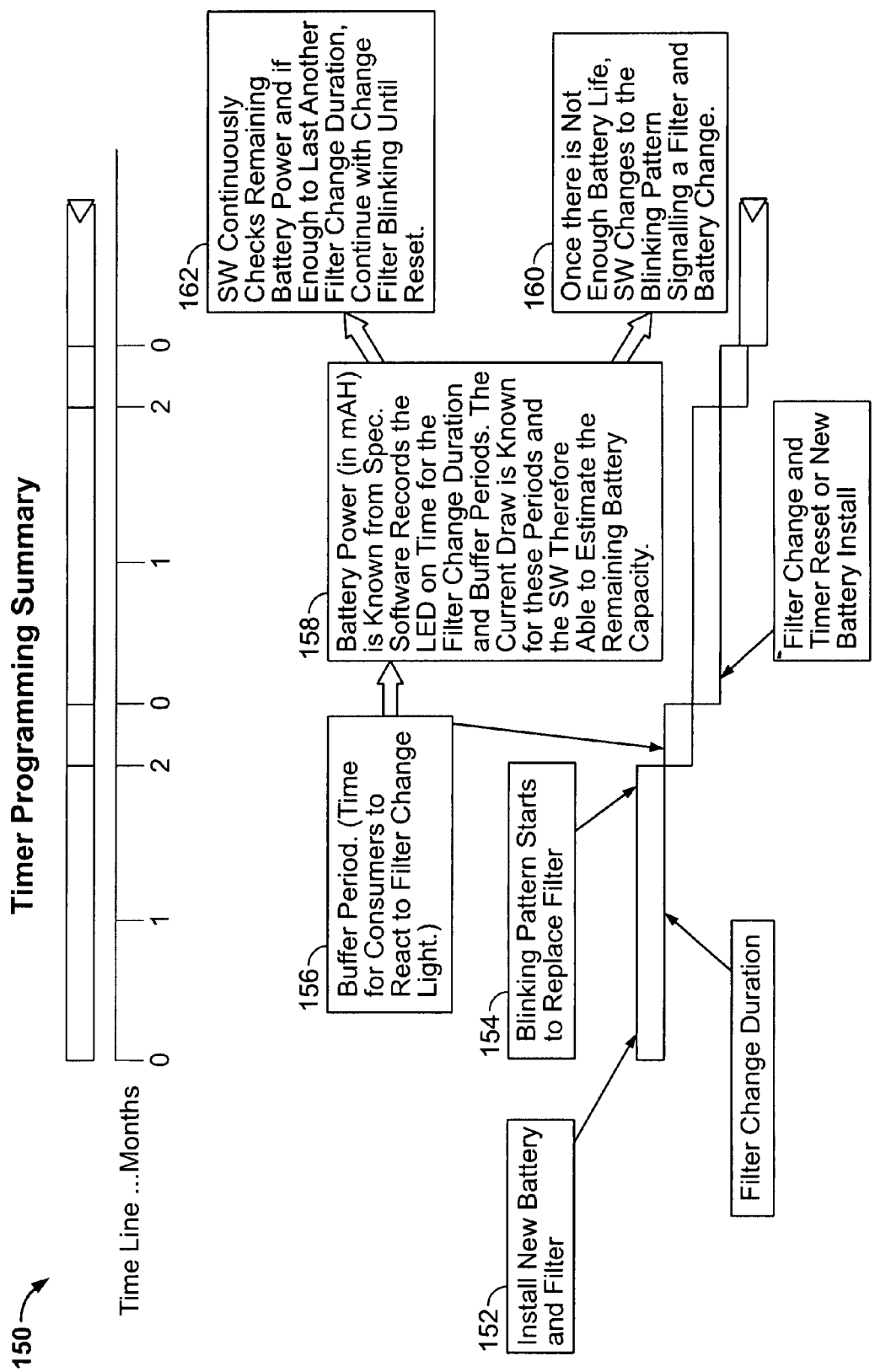
FIG. 4 is a schematic view of a software algorithm for the monitoring system shown in FIG. 3.

FIG. 4 shows a software algorithm 150 that may be incorporated in processor 142 for monitoring the condition of filter cartridge 120. Algorithm 150 begins at step 152 with the installation of a new filter cartridge and a new battery 148 (FIG. 3). At step 154, processor 142 sends a blinking pattern to display 122 after a default time period. In one embodiment, the default time period is a period of three months. A buffer period is provided at 156 for the user to replace filter cartridge 120. In one embodiment, when filter cartridge 120 is replaced, the timer is reset. Alternatively, battery 148 may be replaced when filter cartridge 120 is replaced. At step 158, processor 142 estimates a remaining battery capacity based on the time the battery has been in use. If the remaining battery capacity is determined to be less than that needed for the life of a filter cartridge, algorithm 150 continues at step 160 where another blinking pattern is shown in display 122 signaling a need for a filter cartridge change and a battery change. In one embodiment, the blinking pattern signaling the need for both a filter cartridge change and a battery change is faster than the blinking pattern signaling the need for only a filter cartridge change. If the battery capacity is determined to be sufficient for the life of another filter cartridge, processing continues at step 162 where display 122 continues to indicate a need for a filter change.

Figure 5:
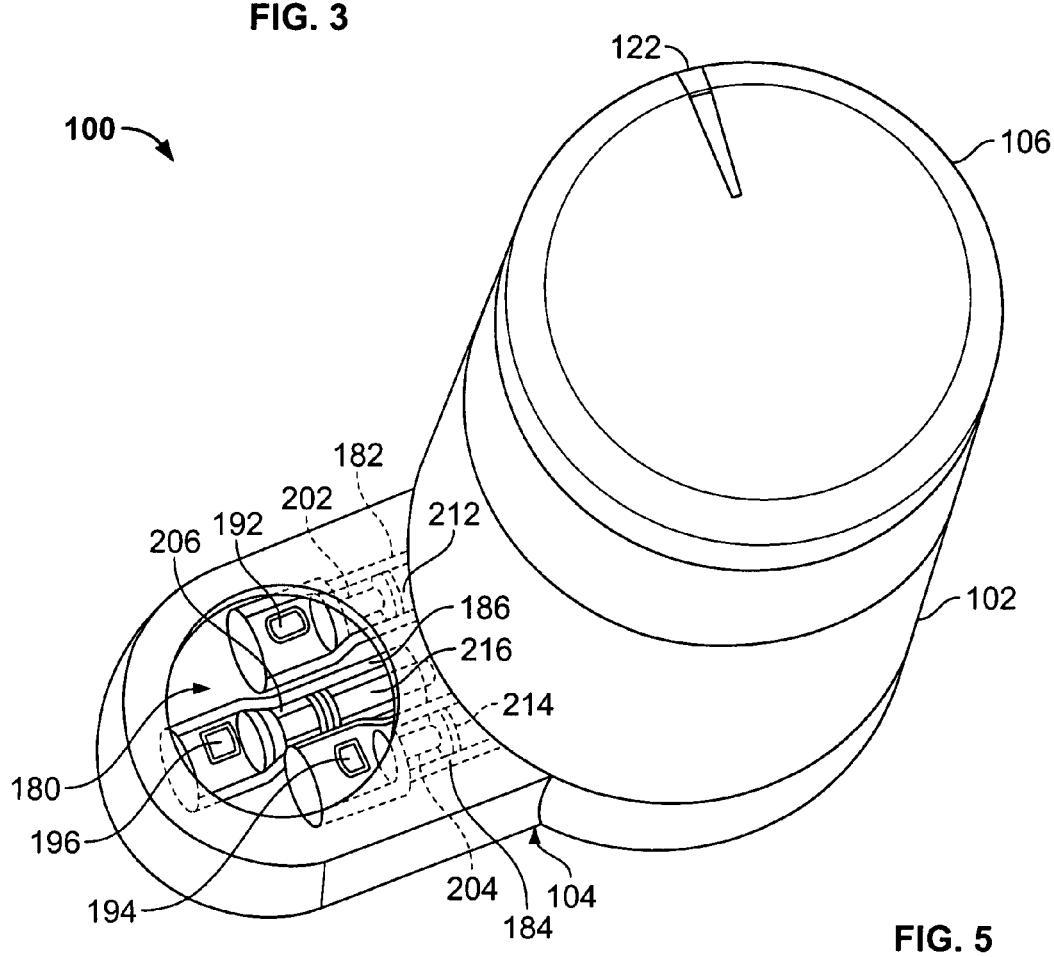
FIG. 5 is a top perspective view of a filter assembly with a tightening nut section removed.

FIG. 5 shows a top perspective view of filter assembly 100 with tightening nut 112 removed. Inlet 114 in tightening nut 112 opens into a water receiving chamber 180. Water receiving chamber 180 includes a plurality of passageways in fluid communication with at least one outlet from water receiving chamber 180. More specifically, water receiving chamber 180 includes a first passageway 182 in fluid communication with first outlet 130, a second passageway 184 in fluid communication with second outlet 132, and a third passageway 186 in fluid communication with third outlet 134. Each passageway 182, 184, and 186 includes an inlet 192, 194, and 196, respectively, and an outlet 202, 204, and 206 respectively.

Each passageway 182, 184, and 186 also includes a valve 212, 214, and 216, respectively, that is positioned within each passageway 182, 184, 186 to control water flow between inlets 192, 194, 196 and outlets 202, 204, 206 of passageways 182, 184, 186. Valves 212, 214, and 216 are movable along a length of each respective passageway to allow water to flow from a respective inlet to a respective outlet as will be described.

Figure 6:
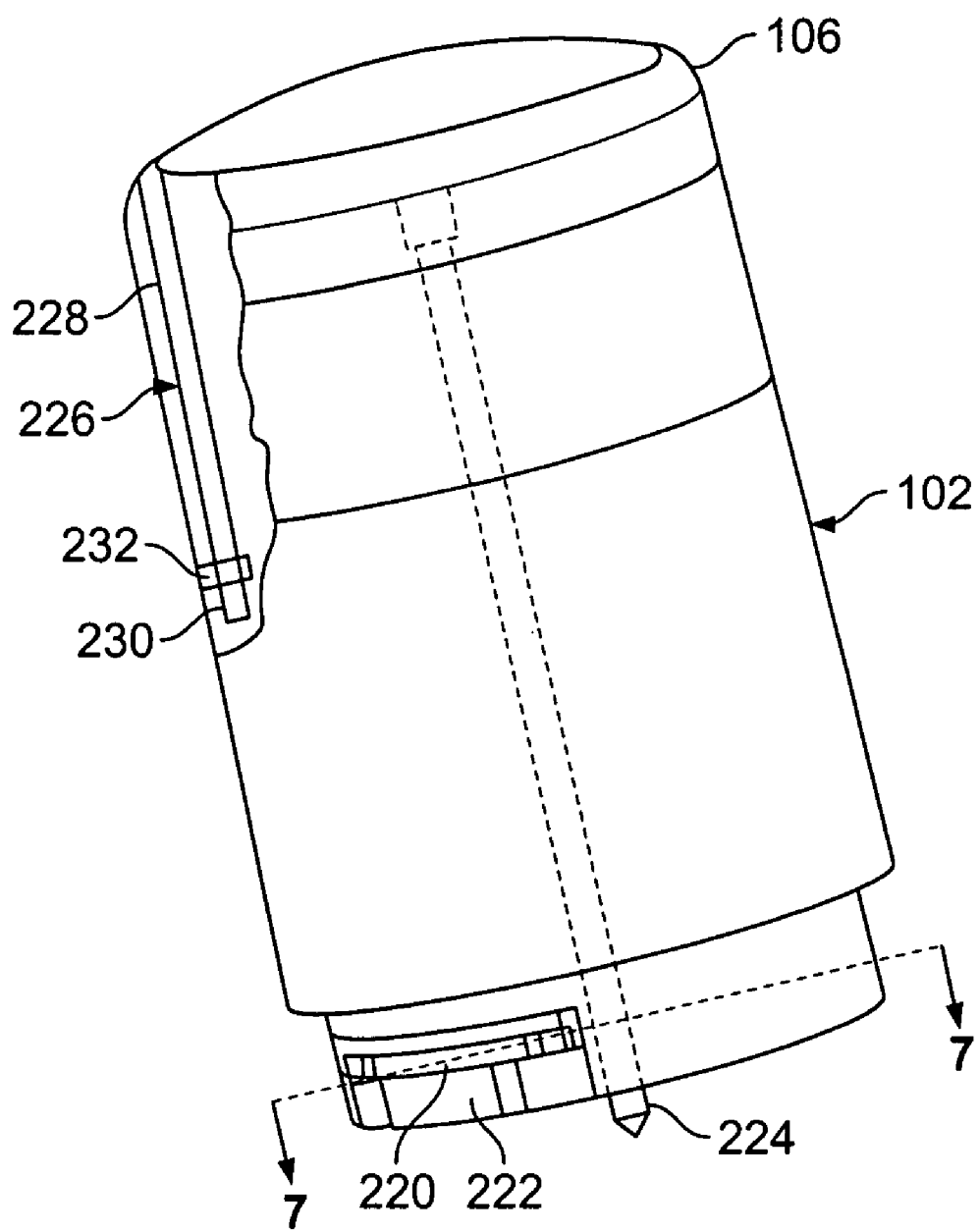
FIG. 6 is a perspective view of the filter system shown in FIG. 1 with the base removed.

FIG. 6 shows a perspective view of filter assembly 100 with base 104 removed. A cam 220 and a detent member 222 are rotatably mounted at a lower end of body 102. An actuating stem 224 extends through a center channel of filter cartridge 120 (FIG. 1) within body 102 and is coupled to an underside of cover 106 (shown in phantom outline) so that cam 220 and detent member 222 are rotated by rotation of cover 106. Valves 212, 214, and 216 (FIG. 5) are moved or operated by rotation of cam 220 and detent member 222.

A biasing member 226 is provided in filter assembly 100 to bias cover 106, cam 220, and detent member 222 toward a neutral position. Biasing member 226 is coupled between cover 106 and body 102. In one embodiment, biasing member 226 is a flat spring having a first end 228 coupled to cover 106 and a second end 230 that is received and slidably retained by a retention element 232 formed on an inner wall of body 102. Biasing member 226 is operable to bias cover 106, cam 220, and detent member 222 toward the neutral position in response to either clockwise or counterclockwise rotation of cover 106.

Figure 7:
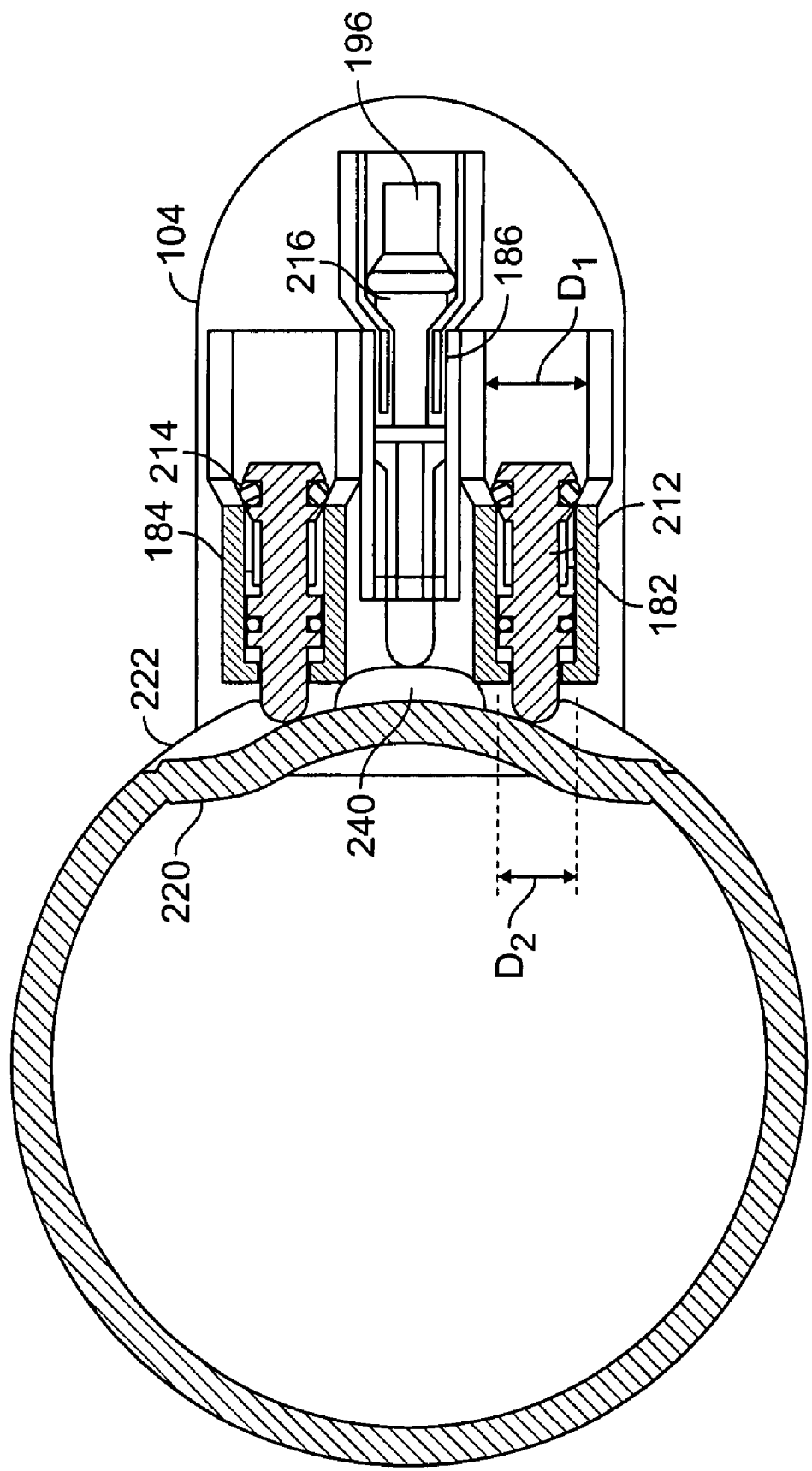
FIG. 7 is a sectional view taken along the line 7-7 through the cam shown in FIG. 6 with the cam and the detent member in a default position.

FIG. 7 shows a sectional view through cam 220 with cam 220 and detent member 222 in a neutral or default position. First valve 212 and second valve 214 engage cam 220 and are operated by rotation of cam 220. Valve 216 engages detent member 222 and is operated by rotation of detent member 222. In the neutral or default position shown, first valve 212 and second valve 214 are in a closed position such that flow of water through passageways 182 and 184 is disabled. Third valve 216 engages detent member 222 at a center section 240. When valve 216 engages center section 240, valve 216 is moved to an open position to allow water to flow through passageway 186.

In the exemplary embodiment, each passageway 182, 184, and 186 has a first diameter $D_1$ proximate passageway inlets 192, 194, and 196 (FIG. 5) and a second diameter $D_2$ proximate passageway outlets 202, 204, and 206 (FIG. 5). In the exemplary embodiment, first diameter $D_1$ is greater than second $D_2$ and further passageways 182, 184, and 186 are substantially uniform in size. In alternative embodiments, passageways 182, 184, and 186 may be of different diameters.

Figure 8:
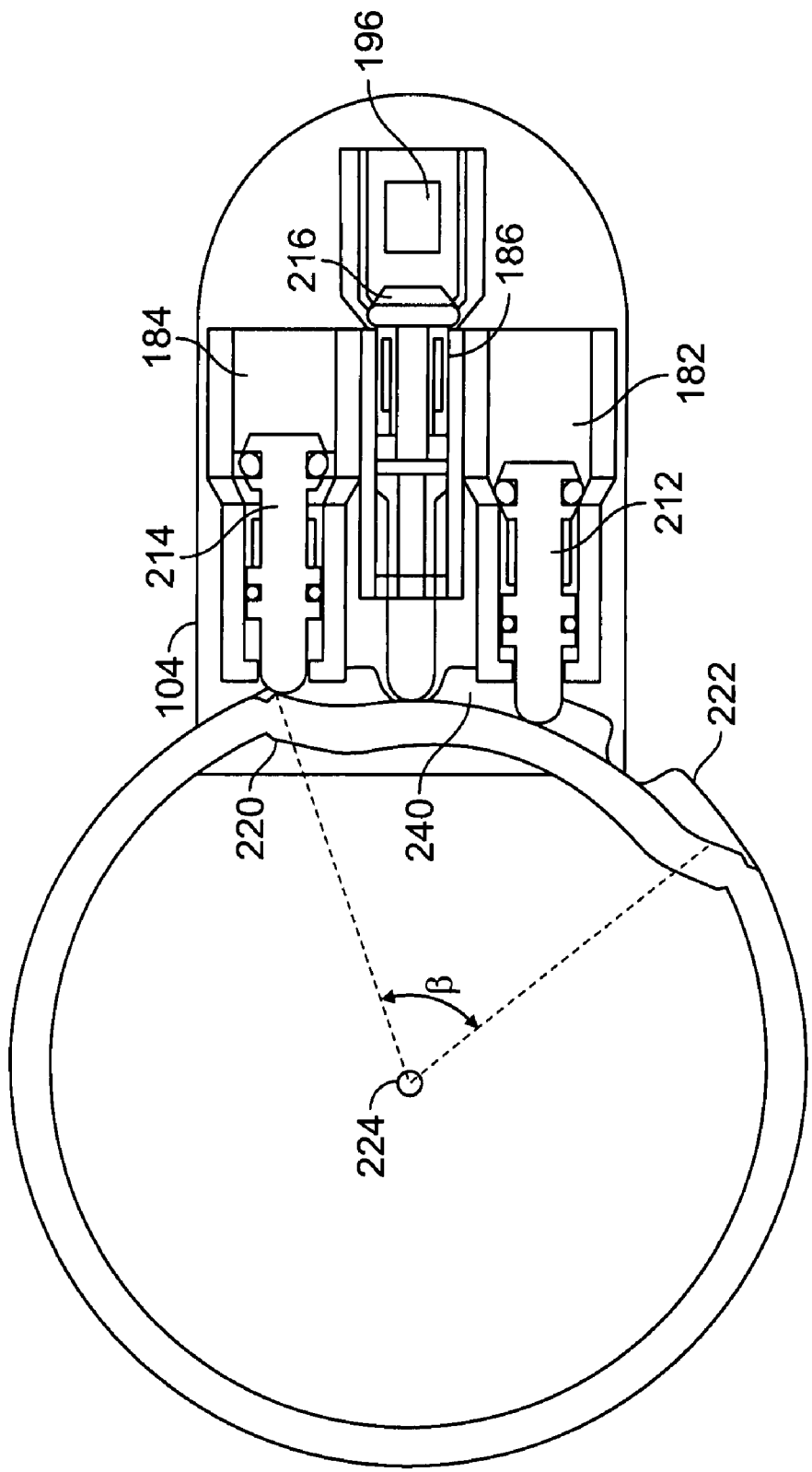
FIG. 8 is a sectional view taken along the line 7-7 through the cam shown in FIG. 6 with the cam and the detent member moved from the default position.

FIG. 8 is a sectional view through cam 220 with cam 220 and detent member 222 rotated away from the neutral or default position. As shown, cam 220 moves valve 214 to an open position to allow water to flow through passageway 184. Valve 212 is in a closed position. Also, valve 216 is moved away from center section 240 on detent member 222 and is in a closed position. Cam 220 and detent member 222 are formed such that only one of valves 212, 214, and 216 is in an open position at one time. Further, biasing member 226 returns cover 106 as well as cam 220 and detent member 222 to the neutral or default position when the user turns off the water at the faucet. However, when the water is turned on, water pressure on valves 212, 214, and 216 is sufficient to overcome biasing member 226 and hold cover 106, cam 220 and detent member 222 in the position selected by the user.

Cam 220 and cover 106 are rotatable through an angle β from a first position to a second position. First position is depicted in FIG. 8 and represents clockwise rotation of cover 106 and cam 220 from a neutral position to a position wherein valve 212 is in an open positioning an exemplary embodiment, when valve 212 is in an open position, filtered water is provided. In the second position (not shown), cover 106 and cam 220 are rotated in a counterclockwise direction to a position wherein valve 214 is in an open position. In one embodiment, when valve 214 is in an open position, unfiltered water is provided. In an exemplary embodiment, second position is an unfiltered water spray. The neutral or default position is between the first and second positions.

Valves 212, 214, and 216 are of a construction known in the art. Generally, each valve 212, 214, and 216 is formed with a substantially cylindrical body including a contact tip that engages cam 220 and detent member 222. The body includes a first section and a second section having raised diameters that are slightly less than passageway diameters D1 and D2. Each of the first section and the second section is configured to receive a seal for sealing against the interior of passageways 182, 184, and 186.

Figure 9:
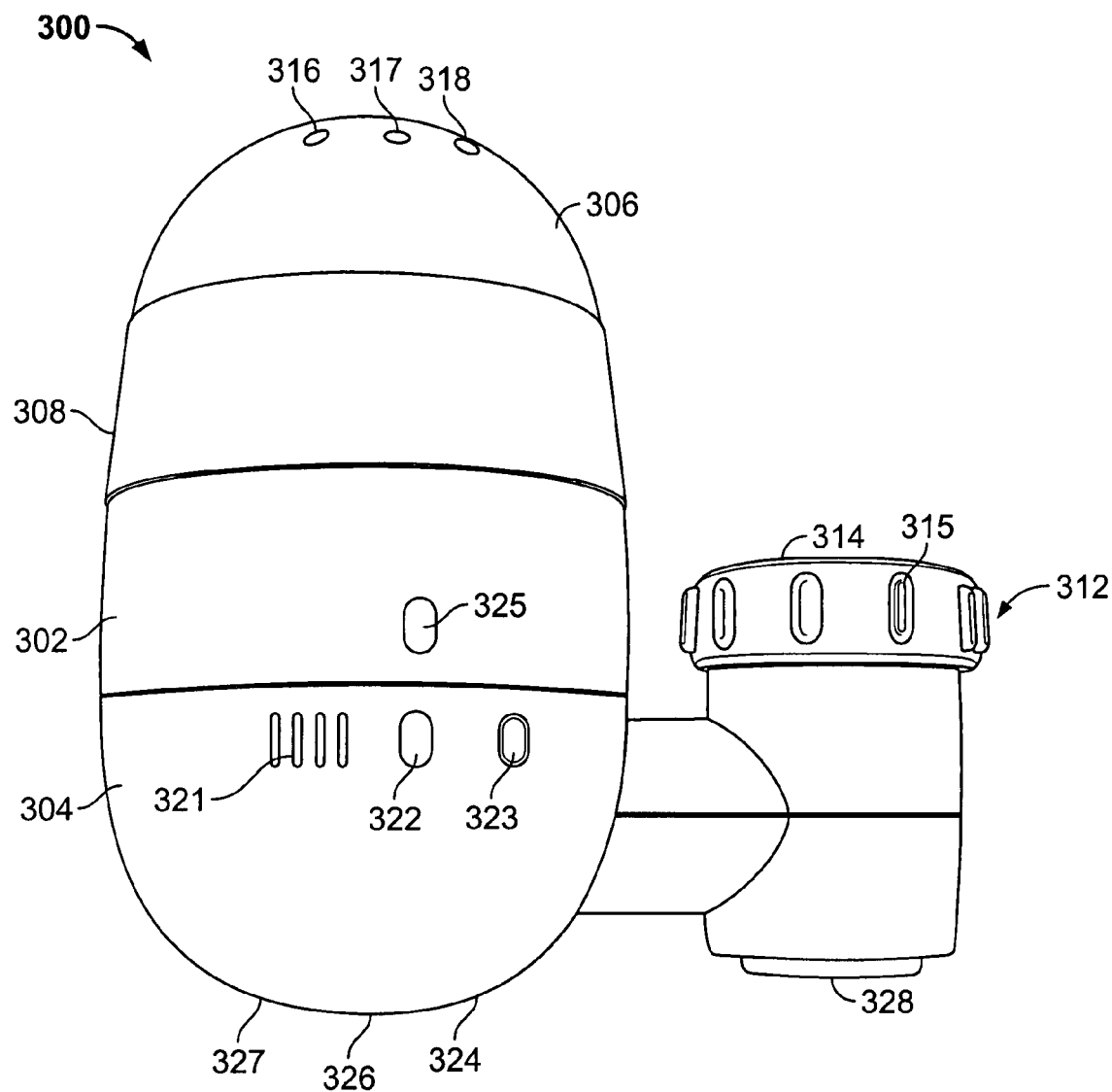
FIG. 9 is a side view of an alternative exemplary water filter system mountable to a faucet.

FIG. 9 shows an alternative exemplary water filter assembly 300 that is mountable to a water faucet (not shown). Water filter assembly 300 includes a body 302 rotatably coupled to a base 304. A cover 306 is removably coupled to body 302 to facilitate replacement of a filter cartridge enclosed by cover 306. Cover 306 includes a soft touch ring 308 to aid a user in manipulation of body 302 and/or cover 306. Base 304 includes a tightening nut 312 positioned about an inlet 314 and configured to couple water filtration assembly 300 to a water supply, such as a water faucet (not shown). In one embodiment, tightening nut 312 also includes a soft touch ring (not shown) to facilitate manipulating tightening nut 312. Water filter assembly 300 includes a filter compartment configured to house a filter cartridge 320. The filter cartridge may be integrated with body 302 and/or base 304 or may be an independently fabricated component that is coupled to body 302 and/or base 304. Filter cartridge 320 is configured to filter water flowing through the filter compartment defined by water filter assembly 300, as described in greater detail below. Base 304 defines one or more outlets defined through a bottom surface 324 that delivers filtered and/or unfiltered water as selected by a user based on a position of body 302 with respect to base 304.

In the exemplary embodiment, cover 306 includes a plurality of light emitting diodes (LEDs), such as LEDs 316, 317, and/or 318, for visually indicating to a user a position and/or configuration of water filter assembly 300. In one embodiment, LED 317 lights or flashes one or more times, such as three times, to prompt the user to replace filter cartridge 320. LED light 317 may also light or flash one or more times, such as nine times, in amber color to prompt the user to replace filter cartridge 320 and a battery (not shown), which provides power to water filter assembly 300. Further, LED 316 and LED 318 light in green to indicate a filtered water spray configuration or position and a filtered water stream configuration or position of water filter assembly 300, respectively. It should be apparent to those skilled in the art and guided by the teachings herein provided that any suitable visual signal and/or any suitable audio signal may indicate to a user the selected water filter assembly position and/or configuration.

As shown in FIG. 9, base 304 includes icons 321, 322, and 323 to indicate to the user a filtered water spray position, an unfiltered water stream position and a filtered water stream position, respectively. In one embodiment, body 302 is rotatable with respect to base 304 to align a marker 325 with icon 321, 322 or 323 to indicate a corresponding position for water filter assembly 300.

Figure 10:
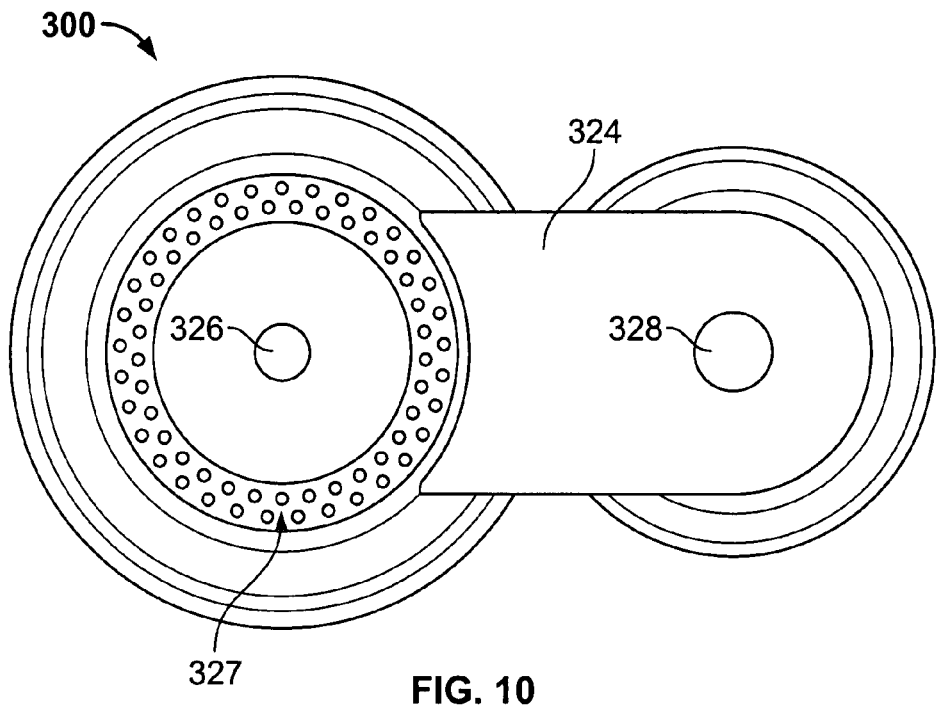
FIG. 10 is a bottom view of the water filter system shown in FIG. 9.

FIG. 10 is a bottom view of water filter assembly 300 showing bottom surface 324. Water filter assembly 300 includes one or more first outlets 326 and one or more second outlets 327 defined through bottom surface 324. In the exemplary embodiment, one first outlet 326 is defined within base 304, such as through bottom surface 324, and configured to supply a filtered water stream with water filter assembly 300 in the filtered water stream position. A plurality of second outlets 327 are defined within base 304, such as through bottom surface 324, and configured to supply a filtered water spray with water filter assembly 300 in the filtered water spray position. A third outlet 328 is defined within base 304, such as through bottom surface 324, and configured to supply an unfiltered water stream with water filter assembly 300 in the unfiltered water stream position. Alternatively or in addition, third outlet 328 is configured to supply an unfiltered water spray with water filter assembly 300 in an unfiltered water spray position.

Figure 11:
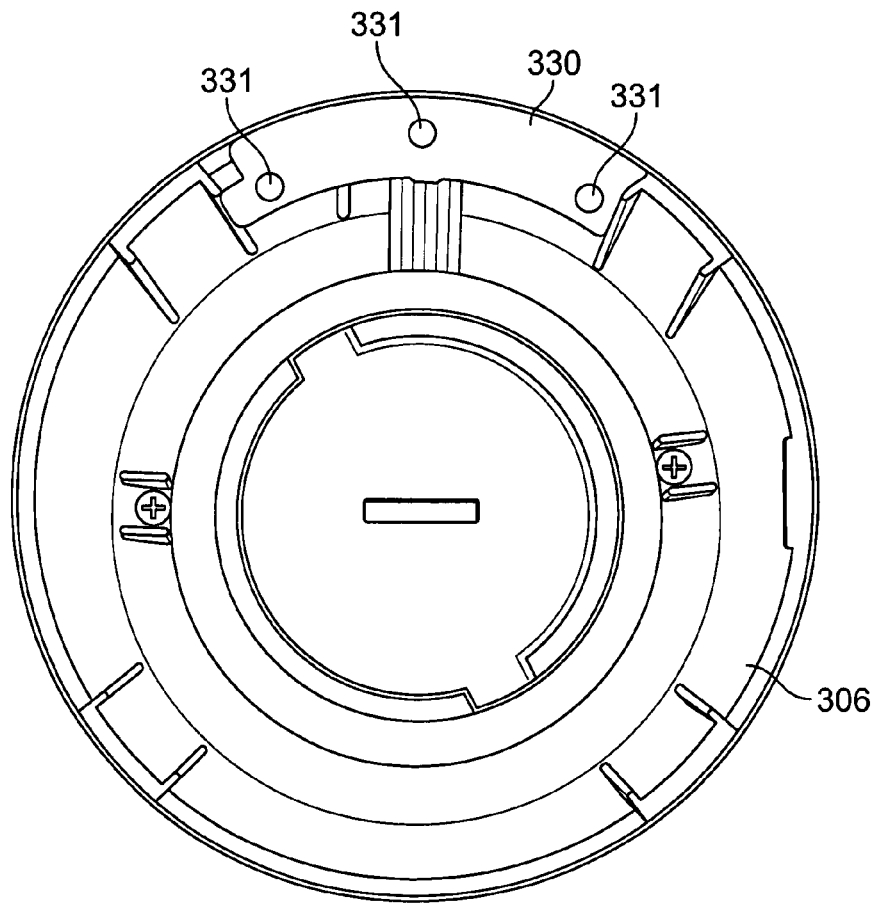
FIG. 11 is a bottom view of a cover of the water filter system shown in FIG. 9.

FIG. 11 shows a bottom view of cover 306 of water filter assembly 300. In the exemplary embodiment, cover 306 includes a platform 330 that extends at least partially along an inner surface of cover 306. Platform 330 extends inwardly from the cover inner surface at a lower end thereof. Platform 330 is configured to operatively couple with body 302 with cover 306 coupled to body 302. Three reed switches 331 are coupled to platform 330, for example, at a first or left portion, a second or middle portion, and a third or right portion of platform 330. Reed switches 331 are electrically coupled to a battery (not shown) positioned within cover 306 or other suitable power source and configured to detect a working condition of filter cartridge 320 according to a rotational position of body 302 with respect to base 304.

Figure 12:
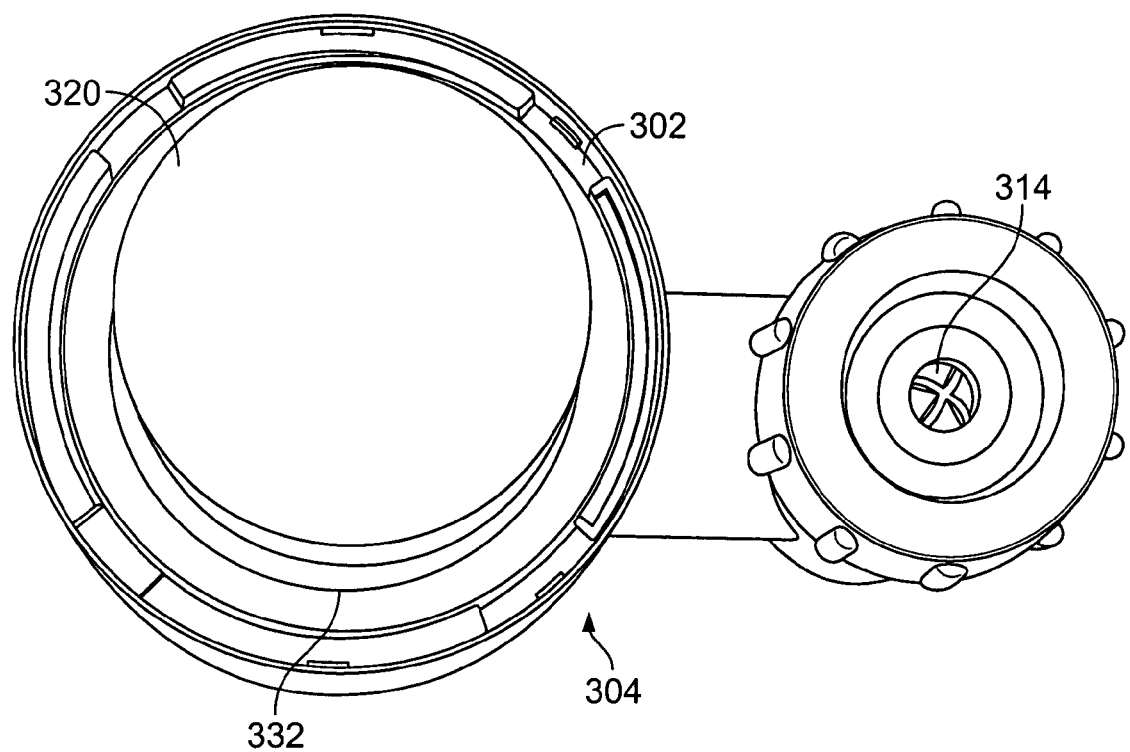
FIG. 12 is a top view of the water filter system shown in FIG. 9 with a cover removed.
Figure 13:
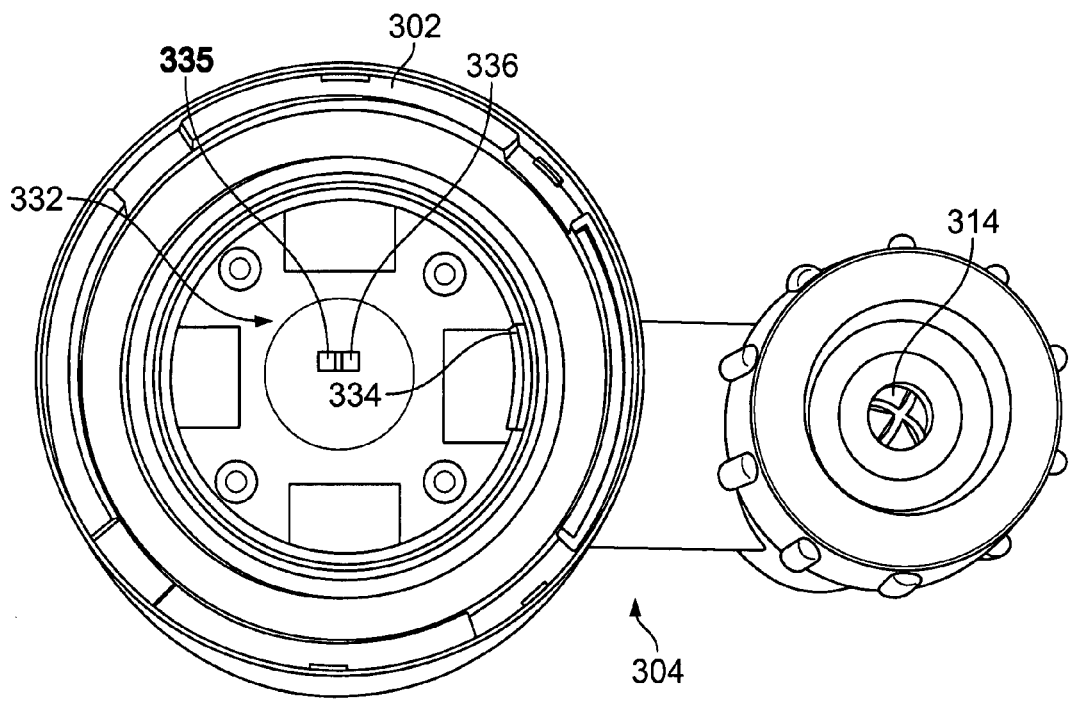
FIG. 13 is a top view of the water filter system shown in FIG. 9 with the cover and a filter cartridge removed.

FIG. 12 is a top view of water filter assembly 300 with cover 306 removed to show water filter assembly 300. In one embodiment, body 302 is rotatably mounted on base 304, and filter cartridge 320 is positioned within a filter housing or compartment 332 at least partially defined within base 304. In the exemplary embodiment, filter compartment 332 extends through body 302 and into base 304. FIG. 13 is a top view of water filter assembly 300 with cover 306 and filter cartridge 320 removed. Filter compartment 332 defines at least one filter inlet 334 providing fluid communication between inlet 314 and filter compartment 332. A first housing outlet 335, such as a filtered spray outlet, and a second housing outlet 336, such as a filter stream outlet, are defined through filter compartment 332, such as through a bottom wall of filter compartment 332, to selectively provide a filtered water spray through second outlets 327 defined through bottom surface 324 or a filtered water stream through first outlet 326 defined through bottom surface 324, respectively.

Figure 14:
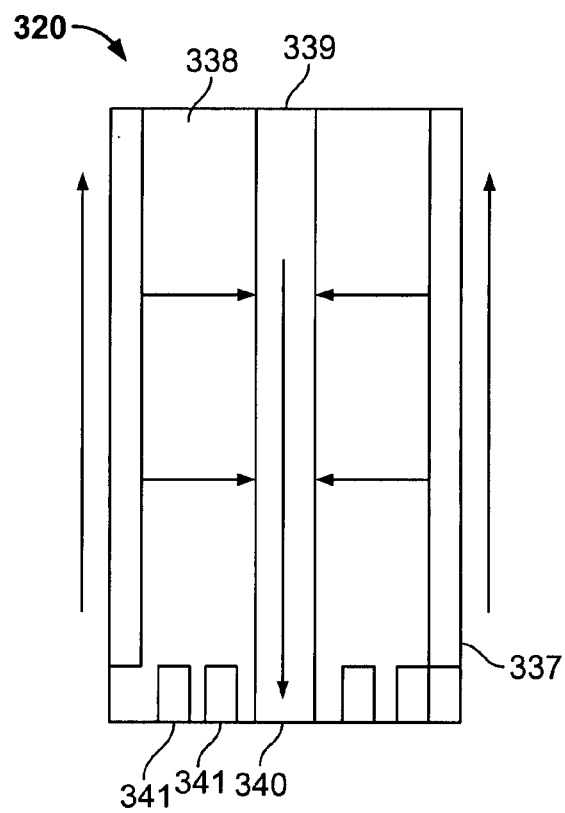
FIG. 14 is schematic view of a water flow path through the filter cartridge.

FIG. 14 is a schematic view of a water flow path through filter cartridge 320. In the exemplary embodiment, filter cartridge 320 includes a housing 337 and a carbon block 338 positioned within housing 337. Carbon block 338 is configured to remove particles from water flowing through carbon block 338. Carbon block 338 defines a central passage 339 in communication with a filter outlet 340 defined through housing 337. Water flows from filter inlet 334 into filter compartment 332 and through a plurality of openings 341 defined through a bottom portion of housing 337. The water is directed to flow upward along a space defined between an inner surface of housing 337 and an outer circumferential surface of carbon block 338. As water moves along the outer surface of carbon block 338, water permeates through carbon block 338, and carbon block 338 removes undesired particles from the water. The filtered water then flows downward through central passage 339 and exits filter cartridge 320 through filter outlet 340. Water exiting filter cartridge 320 selectively flows through first housing outlet 335 or second housing outlet 336, as described in greater detail below.

Figure 15:
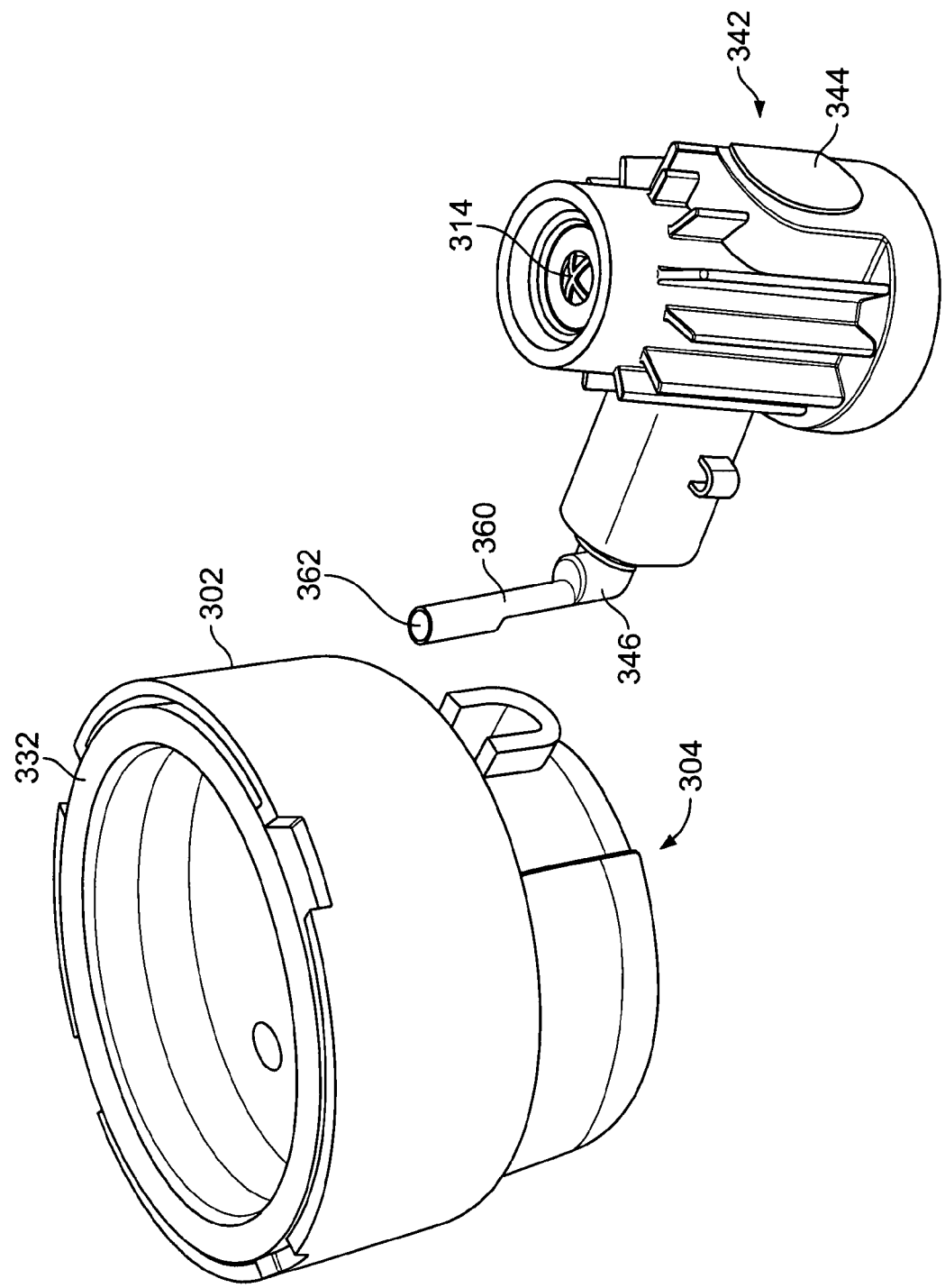
FIG. 15 is an exploded perspective view of a body and a valve assembly of the water filter system shown in FIG. 9.
Figure 16:
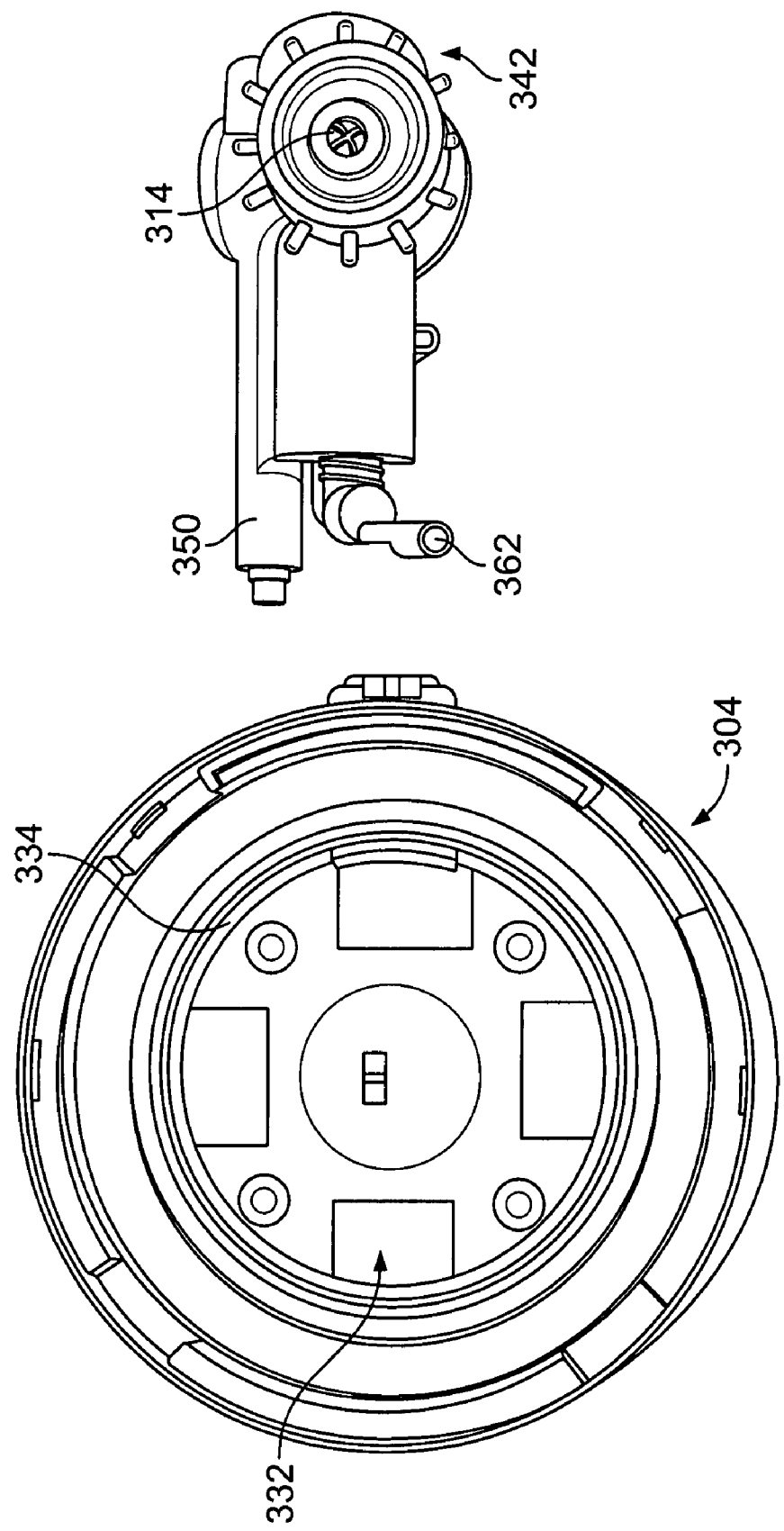
FIG. 16 is an exploded top view of the body and the valve assembly of the water filter system.
Figure 17:
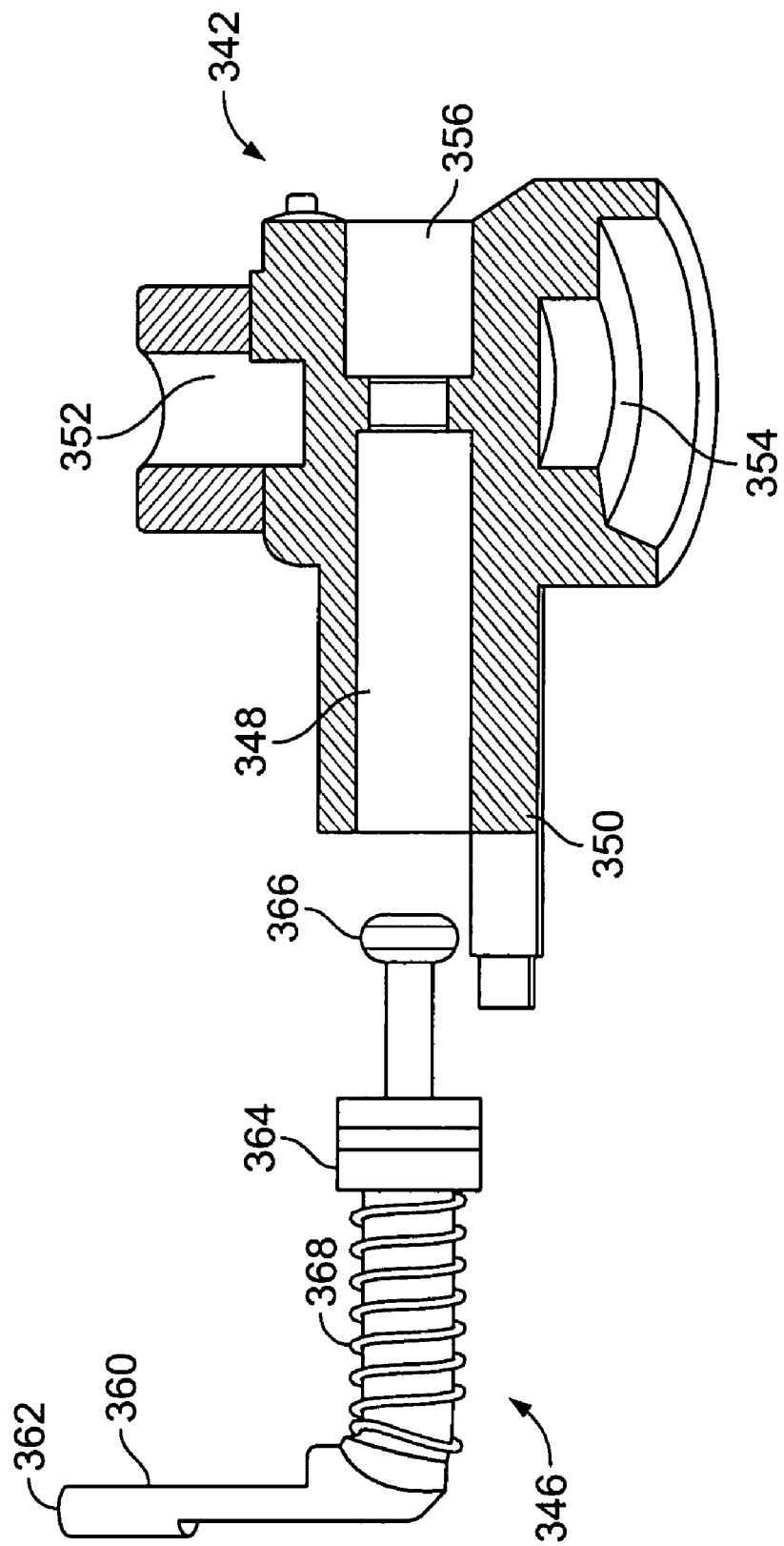
FIG. 17 is an exploded cross-sectional view of a valve assembly of the water filter system.

FIG. 15 is an exploded perspective view of a portion of water filter assembly 300 including filter compartment 332 positioned within body 302 and a valve assembly 342 that is positionable within base 304. FIG. 16 is an exploded top view of filter compartment 332 positioned within body 302 and valve assembly 342. Valve assembly 342 is configured to facilitate controlling or directing water flow through water filter assembly 300. Valve assembly 342 includes a valve body 344 and a valve stem 346 movably positioned within a first passage 348, shown in FIG. 17, defined by valve body 344. FIG. 17 is an exploded sectional view of valve assembly 342. Referring further to FIG. 17, valve body 344 defines first passage 348 and a second passage 350. First passage 348 forms a passage inlet 352, a first passage outlet 354 and a second passage outlet 356. Second passage 350 extends into body 302 to provide fluid communication between inlet 314 and filter compartment 332 through filter inlet 334 shown in FIG. 16.

In the exemplary embodiment, inlet 352 is in fluid communication with inlet 314 for receiving water from the coupled water faucet. First passage outlet 354 is coupled in fluid communication with third output 328, shown in FIG. 9, for supplying an unfiltered water stream. Second passage outlet 356 is coupled in fluid communication with second passage 350 for supplying water into filter compartment 332.

In the exemplary embodiment, valve stem 346 is movable within first passage 348 between a first position and a second position for controlling or directing water output selectively through first outlet 326, second outlet 327 or third outlet 328. Valve stem 346 further includes a valve arm 360 extending upwardly from an end of valve stem 346 and a magnet 362 positioned at or at least partially within an upper end of valve arm 360.

Valve stem 346 further includes a first O-ring seal 364 sealing contacting an interior surface of first passage 348 to facilitate preventing water flow into base 304. Valve stem 346 also includes a second O-ring seal 366 to facilitate selectively supplying water to or bypassing filter cartridge 320. A spring member 368 surrounds valve stem 346 and biases valve stem 346 toward a default valve position such that first passage 348 provides fluid communication between inlet 314 and third outlet 328 for supplying unfiltered water. It should be apparent to those skilled in the art and guided by the teachings herein provided that any suitable biasing member may be utilized in alternative embodiments for biasing valve stem 346 toward the default valve position.

Figure 19:
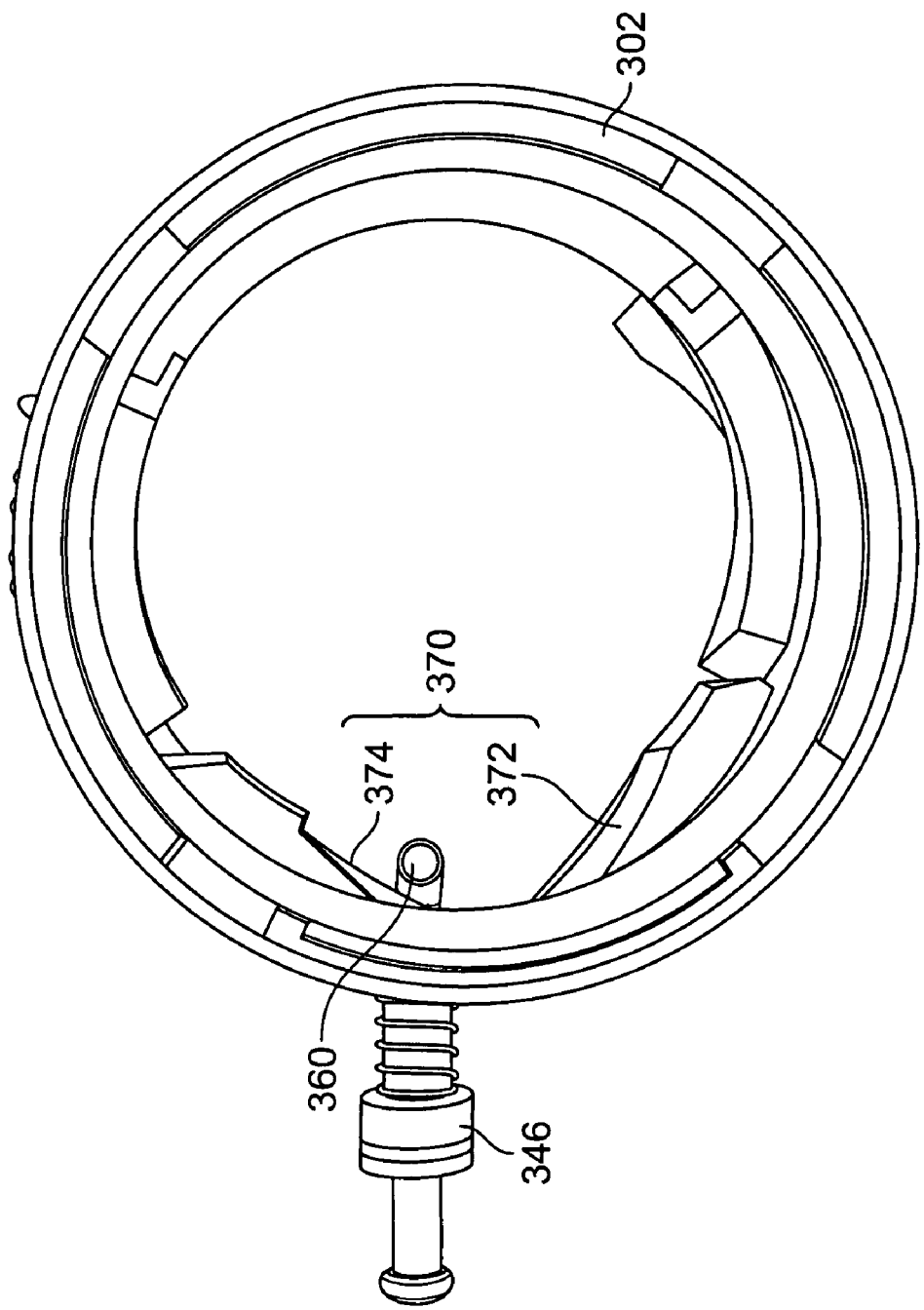
FIG. 19 shows a valve arm operatively coupled with a cam formed on the body.

In one embodiment, the upper end of valve arm 360 is configured to engage with body 302 such that valve stem 346 is slidably movable within first passage 348 when body 302 rotates with respect to base 304, as described in greater detail below with respect to FIG. 19.

Figure 18:
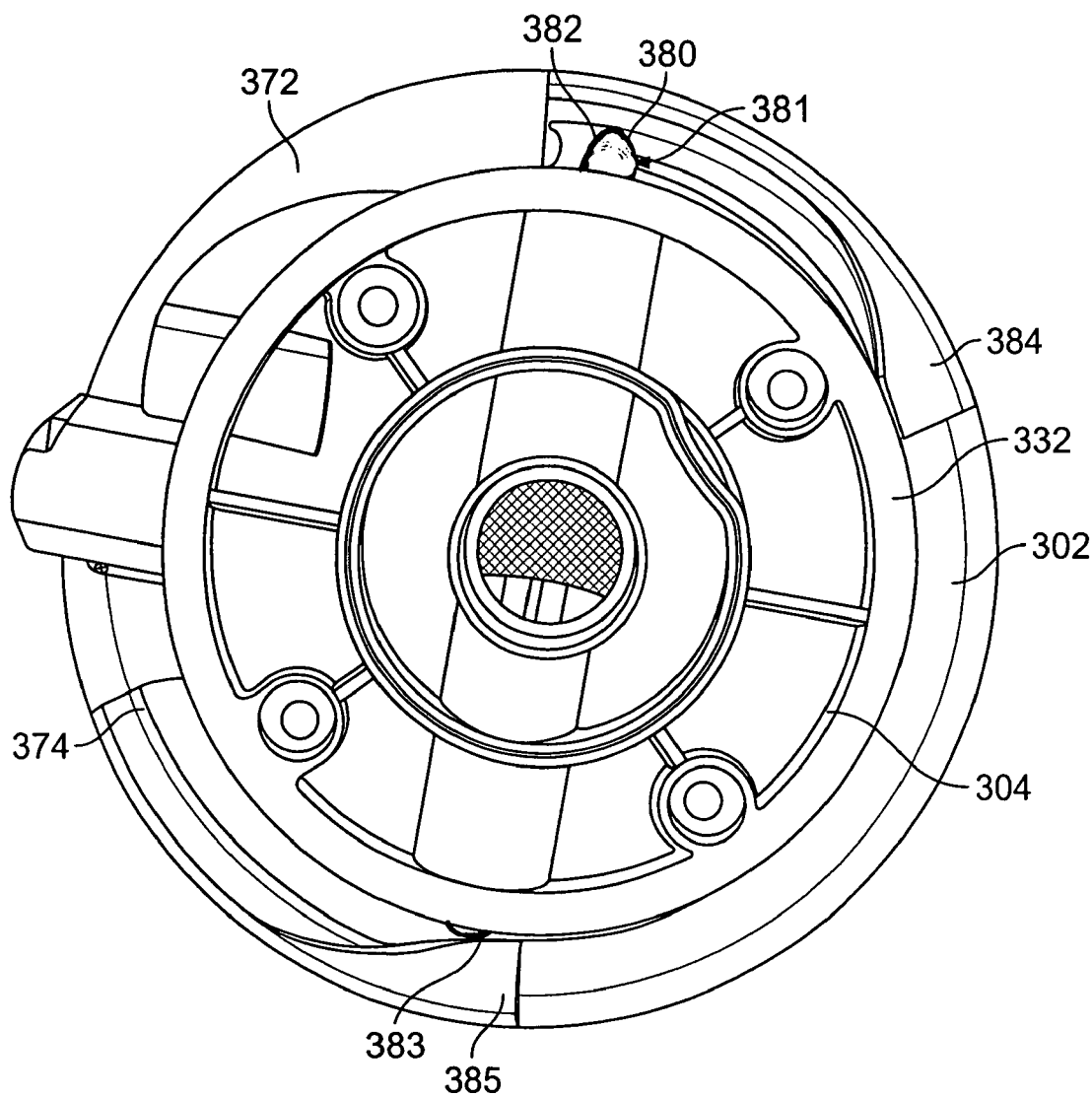
FIG. 18 is a bottom view of a portion of the base coupled to the body with a bottom cover removed.

FIG. 18 is a bottom view of body 302. In the exemplary embodiment, body 302 includes a cam 370 formed on or defined by body 302. In one embodiment, cam 370 includes a first cam surface 372 and a second cam surface 374, as shown in FIG. 18. FIG. 19 shows valve arm 360 cooperating with cam 370 of body 302. As described above, valve arm 360 is positioned within body 302 such that valve arm 360 contacts first cam surface 372 or second cam surface 374 when body 302 rotates in a first rotational direction or an opposing second rotational direction, respectively, with respect to base 304. First cam surface 372 or second cam surface 374 pulls or urges valve arm 360 to move to a second valve position from the default or first valve position when body 302 rotates with respect to base 304. With valve arm 360 in the second valve position, fluid communication between second passage 350 and filter compartment 332 is provided. Referring further to FIG. 18, in the exemplary embodiment, first housing outlet 335 is coupled in fluid communication with first outlet 326 and second housing outlet 336 is coupled in fluid communication with second outlet 327

An output valve 380 is positioned within base 304 for controlling or directing a filtered water output through first outlet 326 and second outlet 327. In one embodiment, output valve 380 is positioned within a passage 381 defined within filter compartment 332, as shown in FIG. 18. Passage 381 provides fluid communication between filter compartment 332 and first outlet 326 and second outlet 327. In the exemplary embodiment, a first end portion 382 of output valve 380 and an opposing second end portion 383 of output valve 380 each extends radially outwardly from passage 381 and filter compartment 332. As body 302 is rotated in a first rotational direction with respect to base 304, a respective cam 384 formed on or coupled to body 302 urges first end portion 382 radially inwardly with respect to filter compartment 332 to provide fluid communication between first housing outlet 335 and second outlets 327 while preventing water flow through second housing outlet 336. Further, as body 302 is rotated in the first rotational direction with respect to base 304, valve arm 360 follows cam surface 374 and urges valve stem 346 to move within first passage 348 from the first valve stem position to the second valve stem position to provide fluid communication between inlet 314 and filter compartment 332 through second passage 350.

Alternatively, as body 302 is rotated in a second rotational direction opposite the first rotational direction with respect to base 304, a respective cam 385 formed on or coupled to body 302 urges second end portion 383 radially inwardly with respect to filter compartment 332 to provide fluid communication between second housing outlet 336 and first outlet 326 while preventing water flow through first housing outlet 335. Further, as body 302 is rotated in the second rotational direction with respect to base 304, valve arm 360 follows cam surface 372 and urges valve stem 346 to move within first passage 348 from the first valve stem position to the second valve stem position to provide fluid communication between inlet 314 and filter compartment 332 through second passage 350. Thus, output valve 380 moves correspondingly with valve stem 346 and valve arm 360. With valve stem 346 in the second position and output valve 380 in the first position, third passage 381 provides fluid communication between filter compartment 332 and second outlets 327 configured to supply a filtered water spray. With valve stem 346 in the second position and output valve 380 in the second position, third passage 381 provides fluid communication between filter compartment 332 and first outlet 326 configured to supply a filtered water stream.

In one embodiment, one or more biasing members (not shown), such as one or more spring members, couple body 302 to base 304 and biases body 302 toward the default or initial position. In an alternative embodiment, any suitable biasing component, such as biasing member 226 shown in FIG. 6, is employed.

In the exemplary embodiment, one reed switch 331, shown in FIG. 11, is aligned with valve arm 360 when body 302 is positioned at a corresponding first position, second position or default position. Magnet 362, as shown in FIG. 14, positioned within valve arm 360 then activates the corresponding reed switch 331 to detect a corresponding position of valve stem 346 to facilitate detecting a time period for which the corresponding reed switch 331 is activated. In one embodiment, water filter assembly 300 includes a monitoring system operatively coupled to a software algorithm in a similar manner as monitoring system 140, shown in FIG. 3, is operatively coupled to software algorithm 150, shown in FIG. 4, of filter assembly 100. The monitoring system and the software algorithm then monitor the position and/or the condition of filter cartridge 320 based at least partially on the detected position signals.

Faucet mounted water filter assembly 300 provides a cost-effective and reliable system for filtering water at a faucet. The assembly allows the user to select filtered or unfiltered water, and further allows the user to select filtered water in different configuration including a filtered water stream and a filtered water spray. The assembly provides an unfiltered default position that extends the life of the filter cartridge. The system automatically returns to the default position when the water is turned off. In addition, a monitoring system may monitor the time the filter cartridge has been in service and also the volume of water passing through the filter cartridge. A display gives a visual indication that the filter cartridge should be replaced and/or that the monitoring system battery should be replaced.

Exemplary embodiments of a faucet mounted water filter assembly are described above in detail. The components of the faucet mounted filter assembly are not limited to the specific embodiments described herein, but rather may be utilized independently and separately from other components described herein. Each component can also be used in combination with other water filter assemblies.

While the invention has been described in terms of various specific embodiments, those skilled in the art will recognize that the invention can be practiced with modification within the spirit and scope of the claims.

What is claimed is:

1. A faucet mounted water filtration system comprising:
   a base defining an inlet and a plurality of outlets, said base at least partially defining a filter compartment configured to house a filter cartridge;
   a first valve assembly positioned within said base, said first valve assembly defining a first passage and a second passage;
   a second valve assembly positioned within said base, said second valve assembly comprising a valve movably positioned within a third passage defined within said base, said third passage in fluid communication with said filter compartment;
   a valve stem movably positioned within said first passage, with said valve stem in a first position said first passage providing fluid communication between said inlet and a first outlet of said plurality of outlets and with said valve stem in a second position said second passage providing fluid communication between said inlet and said filter compartment; and
   a body rotatably coupled to said base, said body comprising a first cam configured to urge said valve stem from the first position to the second position as said body rotates with respect to said base.

2. A faucet mounted water filtration system in accordance with claim 1 wherein, with said valve stem in the first position, said first passage providing fluid communication between said inlet and said first outlet configured to bypass said filter compartment to supply unfiltered water.

3. A faucet mounted water filtration system in accordance with claim 1 wherein, with said valve stem in the second position, said second passage providing fluid communication between said inlet and said filter compartment, said filter cartridge configured to filter water flowing through said filter compartment.

4. A faucet mounted water filtration system in accordance with claim 1 further comprising a cover removably coupled to said body, said cover configured to enclose said filter cartridge.

5. A faucet mounted water filtration system in accordance with claim 1,
   wherein said valve of said second valve assembly is movable between a first position providing fluid communication between said filter compartment and a second outlet of said plurality of outlets and a second position providing fluid communication between said filter compartment and a third outlet of said plurality of outlets;
   said faucet mounted water filtration system further comprising a second cam formed on said body, said second cam configured to urge said valve towards one of the first position and the second position as said body rotates with respect to said base.

6. A faucet mounted water filtration system in accordance with claim 5 wherein said second cam is configured to urge said valve towards the first position as said body rotates in a first rotational direction with respect to said base and said second cam is configured to urge said valve towards the second position as said body rotates in a second rotational direction opposite the first rotational direction with respect to said base.

7. A faucet mounted water filtration system in accordance with claim 5 wherein, with said valve stem in the second position and said valve in the first position, said third passage providing fluid communication with said second outlet configured to supply a filtered water stream.

8. A faucet mounted water filtration system in accordance with claim 7 wherein, with said valve stem in the second position and said valve in the second position, said third passage providing fluid communication with said third outlet configured to supply a filtered water spray.

9. A faucet mounted water filtration system comprising:
   a base defining an inlet and a plurality of outlets, said base at least partially defining a filter compartment configured to house a filter cartridge;
   a first valve assembly positioned within said base, said first valve assembly defining a first passage and a second passage;
   a valve stem movably positioned within said first passage, with said valve stem in a first position said first passage providing fluid communication between said inlet and a first outlet of said plurality of outlets and with said valve stem in a second position said second passage providing fluid communication between said inlet and said filter compartment;

a second valve assembly positioned within said base, said second valve assembly comprising a valve movably positioned within a third passage defined within said base, said third passage in fluid communication with said filter compartment, said valve movable between a third position providing fluid communication between said filter compartment and a second outlet of said plurality of outlets and a fourth position providing fluid communication between said filter compartment and a third outlet of said plurality of outlets; and a body rotatably coupled to said base, said body comprising a first cam configured to urge said valve stem from the first position to the second position as said body rotates with respect to said base, and a second cam configured to urge said valve towards one of the third position and the fourth position as said body rotates with respect to said base.

10. A faucet mounted water filtration system in accordance with claim 9 wherein, with said valve stem in the first position, said first passage providing fluid communication between said inlet and said first outlet configured to supply unfiltered water.

11. A faucet mounted water filtration system in accordance with claim 9 wherein, with said valve stem in the second position, said second passage providing fluid communication between said inlet and said filter compartment, said filter cartridge configured to filter water flowing through said filter compartment.

12. A faucet mounted water filtration system in accordance with claim 9 wherein said second cam is configured to urge said valve towards the third position as said body rotates in a first rotational direction with respect to said base and said second cam is configured to urge said valve towards the fourth position as said body rotates in a second rotational direction opposite the first rotational direction with respect to said base.

13. A faucet mounted water filtration system in accordance with claim 9 wherein, with said valve stem in the second position and said valve in the third position, said third passage providing fluid communication with said second outlet configured to supply a filtered water stream.

14. A faucet mounted water filtration system in accordance with claim 9 wherein, with said valve stem in the second position and said valve in the fourth position, said third passage providing fluid communication with said third outlet configured to supply a filtered water spray.

15. A method for making a faucet mounted water filtration system, said method comprising:

providing a base defining an inlet and a plurality of outlets, the base at least partially defining a filter compartment configured to house a filter cartridge;

positioning a first valve assembly within the base, the first valve assembly defining a first passage and a second passage;

positioning a second valve assembly within the base, the second valve assembly comprising a valve movably positioned within a third passage defined within the base, the third passage in fluid communication with the filter compartment;

movably positioning a valve stem within the first passage, with the valve stem in a first position the first passage providing fluid communication between the inlet and a first outlet of the plurality of outlets and with the valve stem in a second position the second passage providing fluid communication between the inlet and the filter compartment; and rotatably coupling a body to the base, the body comprising a first cam configured to urge the valve stem from the first position to the second position as the body rotates with respect to the base.

16. A method in accordance with claim 15 further comprising removably coupling a cover to the body, the cover configured to enclose the filter cartridge.

17. A method in accordance with claim 15, wherein the valve of the second valve assembly is movable between a first position providing fluid communication between the filter compartment and a second outlet of the plurality of outlets and a second position providing fluid communication between the filter compartment and a third outlet of the plurality of outlets;

said method further comprising forming a second cam on the body, the second cam configured to urge the valve towards one of the first position and the second position as the body rotates with respect to the base.

18. A method in accordance with claim 17 wherein forming a second cam on the body comprises configuring the second cam to urge the valve towards the first position as the body rotates in a first rotational direction with respect to the base and configuring the second cam to urge the valve towards the second position as the body rotates in a second rotational direction opposite the first rotational direction with respect to the base.

19. A method in accordance with claim 17 further comprising providing fluid communication between the third passage and the second outlet configured to provide a filtered water stream with the valve stem in the second position and the valve in the first position.

20. A method in accordance with claim 17 further comprising providing fluid communication between the third passage and the third outlet configured to provide a filtered water spray with the valve stem in the second position and the valve in the second position.

* * * * *